United States Patent
Jeddeloh et al.

(10) Patent No.: US 7,412,571 B2
(45) Date of Patent: Aug. 12, 2008

(54) MEMORY ARBITRATION SYSTEM AND METHOD HAVING AN ARBITRATION PACKET PROTOCOL

(75) Inventors: Joseph M. Jeddeloh, Shoreview, MN (US); Ralph James, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/731,122

(22) Filed: Mar. 29, 2007

(65) Prior Publication Data

US 2007/0180171 A1 Aug. 2, 2007

Related U.S. Application Data

(63) Continuation of application No. 10/809,839, filed on Mar. 24, 2004, now Pat. No. 7,257,683.

(51) Int. Cl.
*G06F 12/00* (2006.01)

(52) U.S. Cl. ................................ 711/151; 711/158

(58) Field of Classification Search ............... None
See application file for complete search history.

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levy et al. | 364/200 |
| 4,078,228 A | 3/1978 | Miyazaki | 340/147 R |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,843,263 A | 6/1989 | Ando | 307/480 |
| 4,891,808 A | 1/1990 | Williams | 370/112 |
| 4,930,128 A | 5/1990 | Suzuki et al. | 371/12 |

(Continued)

FOREIGN PATENT DOCUMENTS

EP 0 709 786 A1 5/1996

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner*—Reginald G. Bragdon
(74) *Attorney, Agent, or Firm*—Dorsey & Whitney LLP

(57) ABSTRACT

A memory hub and method for transmitting a read response on a data path of a memory hub interposed between a transmitting memory hub and a receiving memory hub. An arbitration packet including data indicative of a data path configuration for an associated read response is received at the memory hub. The arbitration packet is decoded, and the data path is configured in accordance with the data of the arbitration packet. The associated read response is received at the memory hub and the associated read response is coupled to the configured data path for transmitting the same to the receiving memory hub.

32 Claims, 5 Drawing Sheets

U.S. PATENT DOCUMENTS

| | | | | |
|---|---|---|---|---|
| 4,953,930 | A | 9/1990 | Ramsey et al. | 350/96.11 |
| 4,982,185 | A | 1/1991 | Holmberg et al. | 340/825.21 |
| 5,241,506 | A | 8/1993 | Motegi et al. | 365/210 |
| 5,243,703 | A | 9/1993 | Farmwald et al. | 395/325 |
| 5,251,303 | A | 10/1993 | Fogg, Jr. et al. | 395/275 |
| 5,269,022 | A | 12/1993 | Shinjo et al. | 395/700 |
| 5,299,293 | A | 3/1994 | Mestdagh et al. | 359/110 |
| 5,313,590 | A | 5/1994 | Taylor | 395/325 |
| 5,317,752 | A | 5/1994 | Jewett et al. | 395/750 |
| 5,319,755 | A | 6/1994 | Farmwald et al. | 395/325 |
| 5,327,553 | A | 7/1994 | Jewett et al. | 395/575 |
| 5,355,391 | A | 10/1994 | Horowitz et al. | 375/36 |
| 5,432,823 | A | 7/1995 | Gasbarro et al. | 375/356 |
| 5,432,907 | A | 7/1995 | Picazo, Jr. et al. | 395/200 |
| 5,442,770 | A | 8/1995 | Barratt | 395/403 |
| 5,461,627 | A | 10/1995 | Rypinski | 370/95.2 |
| 5,465,229 | A | 11/1995 | Bechtolsheim et al. | 345/477 |
| 5,479,370 | A | 12/1995 | Furuyama et al. | 365/189.12 |
| 5,497,476 | A | 3/1996 | Oldfield et al. | 395/439 |
| 5,502,621 | A | 3/1996 | Schumacher et al. | 361/760 |
| 5,544,319 | A | 8/1996 | Acton et al. | 395/200.07 |
| 5,566,325 | A | 10/1996 | Bruce, II et al. | 395/494 |
| 5,577,220 | A | 11/1996 | Combs et al. | 395/416 |
| 5,581,767 | A | 12/1996 | Katsuki et al. | 395/800 |
| 5,606,717 | A | 2/1997 | Farmwald et al. | 395/856 |
| 5,638,334 | A | 6/1997 | Farmwald et al. | 365/230.03 |
| 5,659,798 | A | 8/1997 | Blumrich et al. | 395/846 |
| 5,687,325 | A | 11/1997 | Chang | 395/284 |
| 5,706,224 | A | 1/1998 | Srinivasan et al. | 365/49 |
| 5,715,456 | A | 2/1998 | Bennett et al. | 395/652 |
| 5,729,709 | A | 3/1998 | Harness | 395/405 |
| 5,748,616 | A | 5/1998 | Riley | 370/242 |
| 5,818,844 | A | 10/1998 | Singh et al. | 370/463 |
| 5,819,304 | A | 10/1998 | Nilsen et al. | 711/5 |
| 5,822,255 | A | 10/1998 | Uchida | 365/194 |
| 5,832,250 | A | 11/1998 | Whittaker | 395/471 |
| 5,875,352 | A | 2/1999 | Gentry et al. | 395/843 |
| 5,875,454 | A | 2/1999 | Craft et al. | 711/113 |
| 5,928,343 | A | 7/1999 | Farmwald et al. | 710/104 |
| 5,966,724 | A | 10/1999 | Ryan | 711/105 |
| 5,973,935 | A | 10/1999 | Schoenfeld et al. | 361/813 |
| 5,973,951 | A | 10/1999 | Bechtolsheim et al. | 365/52 |
| 5,978,567 | A | 11/1999 | Rebane et al. | 395/200.49 |
| 5,987,196 | A | 11/1999 | Noble | 385/14 |
| 6,014,721 | A | 1/2000 | Arimilli et al. | 710/129 |
| 6,023,726 | A | 2/2000 | Saksena | 709/219 |
| 6,029,250 | A | 2/2000 | Keeth | 713/400 |
| 6,031,241 | A | 2/2000 | Silfvast et al. | 250/504 R |
| 6,033,951 | A | 3/2000 | Chao | 438/253 |
| 6,038,630 | A | 3/2000 | Foster et al. | 710/132 |
| 6,061,263 | A | 5/2000 | Boaz et al. | 365/51 |
| 6,061,296 | A | 5/2000 | Ternullo, Jr. et al. | 365/233 |
| 6,064,706 | A | 5/2000 | Driskill et al. | 375/372 |
| 6,067,262 | A | 5/2000 | Irrinki et al. | 365/201 |
| 6,067,649 | A | 5/2000 | Goodwin | 714/718 |
| 6,073,190 | A | 6/2000 | Rooney | 710/56 |
| 6,076,139 | A | 6/2000 | Welker et al. | 711/104 |
| 6,079,008 | A | 6/2000 | Clery, III | 712/11 |
| 6,098,158 | A | 8/2000 | Lay et al. | 711/162 |
| 6,100,735 | A | 8/2000 | Lu | 327/158 |
| 6,105,075 | A | 8/2000 | Ghaffari | 710/5 |
| 6,125,431 | A | 9/2000 | Kobayashi | 711/154 |
| 6,131,149 | A | 10/2000 | Lu et al. | 711/167 |
| 6,134,624 | A | 10/2000 | Burns et al. | 710/131 |
| 6,137,709 | A | 10/2000 | Boaz et al. | 365/51 |
| 6,144,587 | A | 11/2000 | Yoshida | 365/189.05 |
| 6,167,465 | A | 12/2000 | Parvin et al. | 710/22 |
| 6,167,486 | A | 12/2000 | Lee et al. | 711/120 |
| 6,175,571 | B1 | 1/2001 | Haddock et al. | 370/423 |
| 6,185,352 | B1 | 2/2001 | Hurley | 385/114 |
| 6,186,400 | B1 | 2/2001 | Dvorkis et al. | 235/462.45 |
| 6,191,663 | B1 | 2/2001 | Hannah | 333/17.3 |
| 6,201,724 | B1 | 3/2001 | Ishizaki et al. | 365/49 |
| 6,208,180 | B1 | 3/2001 | Fisch et al. | 327/141 |
| 6,219,725 | B1 | 4/2001 | Diehl et al. | 710/26 |
| 6,233,376 | B1 | 5/2001 | Updegrove | 385/14 |
| 6,243,769 | B1 | 6/2001 | Rooney | 710/56 |
| 6,243,831 | B1 | 6/2001 | Mustafa et al. | 714/24 |
| 6,246,618 | B1 | 6/2001 | Yamamoto et al. | 365/200 |
| 6,247,107 | B1 | 6/2001 | Christie | 711/216 |
| 6,249,802 | B1 | 6/2001 | Richardson et al. | 709/200 |
| 6,256,325 | B1 | 7/2001 | Park | 370/503 |
| 6,256,692 | B1 | 7/2001 | Yoda et al. | 710/104 |
| 6,272,600 | B1 | 8/2001 | Talbot et al. | 711/140 |
| 6,272,609 | B1 | 8/2001 | Jeddeloh | 711/169 |
| 6,278,755 | B1 | 8/2001 | Baba et al. | 375/360 |
| 6,285,349 | B1 | 9/2001 | Smith | 345/147 |
| 6,286,083 | B1 | 9/2001 | Chin et al. | 711/151 |
| 6,289,068 | B1 | 9/2001 | Hassoun et al. | 375/376 |
| 6,294,937 | B1 | 9/2001 | Crafts et al. | 327/158 |
| 6,301,637 | B1 | 10/2001 | Krull et al. | 711/112 |
| 6,324,485 | B1 | 11/2001 | Ellis | 702/117 |
| 6,327,642 | B1 | 12/2001 | Lee et al. | 711/120 |
| 6,330,205 | B2 | 12/2001 | Shimizu et al. | 365/230.06 |
| 6,347,055 | B1 | 2/2002 | Motomura | 365/189.05 |
| 6,349,363 | B2 | 2/2002 | Cai et al. | 711/129 |
| 6,356,573 | B1 | 3/2002 | Jonsson et al. | 372/46 |
| 6,367,074 | B1 | 4/2002 | Bates et al. | 717/11 |
| 6,370,068 | B2 | 4/2002 | Rhee | 365/196 |
| 6,373,777 | B1 | 4/2002 | Suzuki | 365/230.03 |
| 6,381,190 | B1 | 4/2002 | Shinkai | 365/230.03 |
| 6,392,653 | B1 | 5/2002 | Malandain et al. | 345/501 |
| 6,401,213 | B1 | 6/2002 | Jeddeloh | 713/401 |
| 6,405,280 | B1 | 6/2002 | Ryan | 711/105 |
| 6,421,744 | B1 | 7/2002 | Morrison et al. | 710/22 |
| 6,430,696 | B1 | 8/2002 | Keeth | 713/503 |
| 6,434,639 | B1 | 8/2002 | Haghighi | 710/39 |
| 6,434,696 | B1 | 8/2002 | Kang | 713/2 |
| 6,434,736 | B1 | 8/2002 | Schaecher et al. | 716/17 |
| 6,438,622 | B1 | 8/2002 | Haghighi et al. | 710/1 |
| 6,438,668 | B1 | 8/2002 | Esfahani et al. | 711/165 |
| 6,449,308 | B1 | 9/2002 | Knight, Jr. et al. | 375/212 |
| 6,453,393 | B1 | 9/2002 | Holman et al. | 711/154 |
| 6,462,978 | B2 | 10/2002 | Shibata et al. | 365/60 |
| 6,463,059 | B1 | 10/2002 | Movshovich et al. | 370/389 |
| 6,467,013 | B1 | 10/2002 | Nizar | 711/1 |
| 6,470,422 | B2 | 10/2002 | Cai et al. | 711/129 |
| 6,473,828 | B1 | 10/2002 | Matsui | 711/104 |
| 6,477,592 | B1 | 11/2002 | Chen et al. | 710/52 |
| 6,477,614 | B1 | 11/2002 | Leddige et al. | 711/5 |
| 6,477,621 | B1 | 11/2002 | Lee et al. | 711/120 |
| 6,479,322 | B2 | 11/2002 | Kawata et al. | 438/109 |
| 6,487,556 | B1 | 11/2002 | Downs et al. | 707/101 |
| 6,490,188 | B2 | 12/2002 | Nuxoll et al. | 365/63 |
| 6,493,803 | B1 | 12/2002 | Pham et al. | 711/147 |
| 6,496,909 | B1 | 12/2002 | Schimmel | 711/163 |
| 6,501,471 | B1 | 12/2002 | Venkataraman et al. | 345/424 |
| 6,505,287 | B2 | 1/2003 | Uematsu | 711/170 |
| 6,523,092 | B1 | 2/2003 | Fanning | 711/134 |
| 6,523,093 | B1 | 2/2003 | Bogin et al. | 711/137 |
| 6,526,483 | B1 | 2/2003 | Cho et al. | 711/154 |
| 6,539,490 | B1 | 3/2003 | Forbes et al. | 713/401 |
| 6,552,564 | B1 | 4/2003 | Forbes et al. | 326/30 |
| 6,564,329 | B1 | 5/2003 | Cheung et al. | 713/322 |
| 6,587,912 | B2 | 7/2003 | Leddige et al. | 711/5 |
| 6,590,816 | B2 | 7/2003 | Perner | 365/200 |
| 6,594,713 | B1 | 7/2003 | Fuoco et al. | 710/31 |
| 6,594,722 | B1 | 7/2003 | Willke, II et al. | 710/313 |
| 6,598,154 | B1 | 7/2003 | Vaid et al. | 712/237 |
| 6,615,325 | B2 | 9/2003 | Mailloux et al. | 711/154 |
| 6,622,188 | B1 | 9/2003 | Goodwin et al. | 710/101 |
| 6,622,227 | B2 | 9/2003 | Zumkehr et al. | 711/167 |
| 6,628,294 | B1 | 9/2003 | Sadowsky et al. | 345/568 |
| 6,629,220 | B1 | 9/2003 | Dyer | 711/158 |

| | | | | | | | |
|---|---|---|---|---|---|---|---|
| 6,631,440 B2 | 10/2003 | Jenne et al. | 711/105 | 2003/0043158 A1 | 3/2003 | Wasserman et al. | 345/545 |
| 6,636,110 B1 | 10/2003 | Ooishi et al. | 327/565 | 2003/0043426 A1 | 3/2003 | Baker et al. | 359/109 |
| 6,636,912 B2 | 10/2003 | Ajanovic et al. | 710/105 | 2003/0093630 A1 | 5/2003 | Richard et al. | 711/154 |
| 6,646,929 B1 | 11/2003 | Moss et al. | 365/194 | 2003/0149809 A1 | 8/2003 | Jensen et al. | 710/22 |
| 6,658,509 B1 | 12/2003 | Bonella et al. | 710/100 | 2003/0156581 A1 | 8/2003 | Osborne | 370/389 |
| 6,662,304 B2 | 12/2003 | Keeth et al. | 713/400 | 2003/0163649 A1 | 8/2003 | Kapur et al. | 711/146 |
| 6,665,202 B2 | 12/2003 | Lindahl et al. | 365/49 | 2003/0177320 A1 | 9/2003 | Sah et al. | 711/158 |
| 6,667,895 B2 | 12/2003 | Jang et al. | 365/63 | 2003/0193927 A1 | 10/2003 | Hronik | 370/351 |
| 6,667,926 B1 | 12/2003 | Chen et al. | 365/221 | 2003/0217223 A1 | 11/2003 | Nino, Jr. et al. | 711/105 |
| 6,670,833 B2 | 12/2003 | Kurd et al. | 327/156 | 2003/0227798 A1 | 12/2003 | Pax | 365/189.12 |
| 6,681,292 B2 | 1/2004 | Creta et al. | 711/119 | 2003/0229762 A1 | 12/2003 | Maiyuran et al. | 711/137 |
| 6,697,926 B2 | 2/2004 | Johnson et al. | 711/167 | 2003/0229770 A1 | 12/2003 | Jeddeloh | 711/213 |
| 6,715,018 B2 | 3/2004 | Farnworth et al. | 710/300 | 2004/0022094 A1 | 2/2004 | Radhakrishnan et al. | 365/200 |
| 6,718,440 B2 | 4/2004 | Maiyuran et al. | 711/137 | 2004/0024948 A1 | 2/2004 | Winkler et al. | 710/311 |
| 6,721,195 B2 | 4/2004 | Brunelle et al. | 365/63 | 2004/0044833 A1 | 3/2004 | Ryan | 711/5 |
| 6,721,860 B2 | 4/2004 | Klein | 711/154 | 2004/0047169 A1 | 3/2004 | Lee et al. | 365/63 |
| 6,724,685 B2 | 4/2004 | Braun et al. | 365/233 | 2004/0107306 A1 | 6/2004 | Barth et al. | 710/310 |
| 6,728,800 B1 | 4/2004 | Lee et al. | 710/54 | 2004/0126115 A1 | 7/2004 | Levy et al. | 398/116 |
| 6,735,679 B1 | 5/2004 | Herbst et al. | 711/167 | 2004/0128449 A1 | 7/2004 | Osborne et al. | 711/137 |
| 6,735,682 B2 | 5/2004 | Segelken et al. | 711/220 | 2004/0144994 A1 | 7/2004 | Lee et al. | 257/200 |
| 6,742,098 B1 | 5/2004 | Halbert et al. | 711/172 | 2004/0160206 A1 | 8/2004 | Komaki et al. | 318/569 |
| 6,745,275 B2 | 6/2004 | Chang | 710/305 | 2004/0193821 A1 | 9/2004 | Ruhovets et al. | 711/167 |
| 6,751,703 B2 | 6/2004 | Chilton | 711/113 | 2004/0225847 A1 | 11/2004 | Wastlick et al. | 711/158 |
| 6,754,812 B1 | 6/2004 | Abdallah et al. | 712/234 | 2004/0236885 A1 | 11/2004 | Fredriksson et al. | 710/100 |
| 6,756,661 B2 | 6/2004 | Tsuneda et al. | 257/673 | 2005/0015426 A1 | 1/2005 | Woodruff et al. | 709/200 |
| 6,760,833 B1 | 7/2004 | Dowling | 712/34 | 2005/0044327 A1 | 2/2005 | Howard et al. | 711/147 |
| 6,771,538 B2 | 8/2004 | Shukuri et al. | 365/185.05 | 2005/0071542 A1 | 3/2005 | Weber et al. | 711/105 |
| 6,775,747 B2 | 8/2004 | Venkatraman | 711/137 | 2005/0086441 A1* | 4/2005 | Meyer et al. | 711/158 |
| 6,782,435 B2 | 8/2004 | Garcia et al. | 710/33 | 2005/0105350 A1 | 5/2005 | Zimmerman | 365/201 |
| 6,789,173 B1 | 9/2004 | Tanaka et al. | 711/147 | 2005/0132159 A1 | 6/2005 | Jeddeloh | 711/167 |
| 6,792,059 B2 | 9/2004 | Yuan et al. | 375/354 | 2005/0149603 A1 | 7/2005 | DeSota et al. | 709/200 |
| 6,792,496 B2 | 9/2004 | Aboulenein et al. | 710/306 | 2005/0166006 A1 | 7/2005 | Talbot et al. | 711/105 |
| 6,795,899 B2 | 9/2004 | Dodd et al. | 711/137 | 2005/0177677 A1 | 8/2005 | Jeddeloh | 711/100 |
| 6,799,246 B1 | 9/2004 | Wise et al. | 711/117 | 2005/0177695 A1 | 8/2005 | Larson et al. | 711/167 |
| 6,799,268 B1 | 9/2004 | Boggs et al. | 712/228 | 2005/0213611 A1 | 9/2005 | James | 370/503 |
| 6,804,760 B2 | 10/2004 | Wiliams | 711/170 | 2005/0268060 A1 | 12/2005 | Cronin et al. | 711/167 |
| 6,804,764 B2 | 10/2004 | LaBerge et al. | 711/170 | 2006/0022724 A1 | 2/2006 | Zerbe et al. | 327/141 |
| 6,807,630 B2 | 10/2004 | Lay et al. | 713/2 | 2006/0066375 A1 | 3/2006 | LaBerge | 327/291 |
| 6,811,320 B1 | 11/2004 | Abbott | 385/58 | 2006/0136683 A1 | 6/2006 | Meyer et al. | 711/154 |
| 6,816,947 B1 | 11/2004 | Huffman | 711/151 | 2006/0174070 A1 | 8/2006 | Jeddeloh | 711/150 |
| 6,820,181 B2 | 11/2004 | Jeddeloh et al. | 711/169 | 2006/0218318 A1 | 9/2006 | James | 710/58 |
| 6,821,029 B1 | 11/2004 | Grung et al. | 385/92 | 2006/0271746 A1 | 11/2006 | Meyer et al. | 711/148 |
| 6,823,023 B1 | 11/2004 | Hannah | 375/296 | 2007/0033317 A1 | 2/2007 | Jeddeloh | 710/317 |
| 6,845,409 B1 | 1/2005 | Talagala et al. | 710/20 | | | | |
| 6,889,304 B2 | 5/2005 | Perego et al. | 711/170 | | | | |
| 6,901,494 B2 | 5/2005 | Zumkehr et al. | 711/167 | | | | |
| 6,904,556 B2 | 6/2005 | Walton et al. | 714/766 | | | | |
| 6,910,109 B2 | 6/2005 | Holman et al. | 711/156 | | | | |
| 6,912,612 B2 | 6/2005 | Kapur et al. | 710/309 | | | | |
| 6,947,672 B2 | 9/2005 | Jiang et al. | 398/135 | | | | |
| 6,980,042 B2 | 12/2005 | LaBerge | 327/291 | | | | |
| 7,046,060 B1 | 5/2006 | Minzoni et al. | 327/158 | | | | |
| 7,120,743 B2 | 10/2006 | Meyer et al. | | | | | |
| 7,133,991 B2 | 11/2006 | James | | | | | |
| 7,136,958 B2 | 11/2006 | Jeddeloh | 710/317 | | | | |
| 7,149,874 B2 | 12/2006 | Jeddeloh | | | | | |
| 7,181,584 B2 | 2/2007 | LaBerge | 711/167 | | | | |
| 7,187,742 B1 | 3/2007 | Logue et al. | 375/376 | | | | |
| 7,251,714 B2 | 7/2007 | James | | | | | |
| 2001/0038611 A1 | 11/2001 | Darcie et al. | 370/248 | | | | |
| 2001/0039612 A1 | 11/2001 | Lee | 713/2 | | | | |
| 2002/0112119 A1 | 8/2002 | Halbert et al. | 711/115 | | | | |
| 2002/0116588 A1 | 8/2002 | Beckert et al. | 711/161 | | | | |
| 2002/0144064 A1 | 10/2002 | Fanning | 711/144 | | | | |
| 2003/0005223 A1 | 1/2003 | Coulson et al. | 711/118 | | | | |
| 2003/0005344 A1 | 1/2003 | Bhamidipati et al. | 713/400 | | | | |

FOREIGN PATENT DOCUMENTS

| | | |
|---|---|---|
| EP | 0849685 A2 | 6/1998 |
| JP | 2001265539 A | 9/2001 |
| WO | WO 93/19422 | 9/1993 |
| WO | WO 02/27499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Rambus, Inc., "Direct Rambus™ Technology Disclosure", Oct. 1997. pp. 1-16.

Shanley, T. et al., "PCI System Architecture", Third Edition, Mindshare, Inc., 1995, pp. 24-25.

* cited by examiner

MEMORY ARBITRATION SYSTEM AND METHOD HAVING AN ARBITRATION PACKET PROTOCOL

CROSS-REFERENCE TO RELATED APPLICATION

This application is a continuation of pending U.S. patent application Ser. No. 10/809,839, filed Mar. 24, 2004.

TECHNICAL FIELD

This present invention is related generally to a memory system for a processor-based computing system, and more particularly, to a hub-based memory system having an arbitration system and method for managing memory responses therein.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The memory devices of the system memory, typically arranged in memory modules having multiple memory devices, are coupled through a memory bus to the memory controller. The processor issues a memory request, which includes a memory command, such as a read command, and an address designating the location from which data or instructions are to be read. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

In memory systems, high data bandwidth is desirable. Generally, bandwidth limitations are not related to the memory controllers since the memory controllers sequence data to and from the system memory as fast as the memory devices allow. One approach that has been taken to increase bandwidth is to increase the speed of the memory data bus coupling the memory controller to the memory devices. Thus, the same amount of information can be moved over the memory data bus in less time. However, despite increasing memory data bus speeds, a corresponding increase in bandwidth does not result. One reason for the non-linear relationship between data bus speed and bandwidth is the hardware limitations within the memory devices themselves. That is, the memory controller has to schedule all memory commands to the memory devices such that the hardware limitations are honored. Although these hardware limitations can be reduced to some degree through the design of the memory device, a compromise must be made because reducing the hardware limitations typically adds cost, power, and/or size to the memory devices, all of which are undesirable alternatives. Thus, given these constraints, although it is easy for memory devices to move "well-behaved" traffic at ever increasing rates, for example, sequel traffic to the same page of a memory device, it is much more difficult for the memory devices to resolve "badly-behaved traffic," such as bouncing between different pages or banks of the memory device. As a result, the increase in memory data bus bandwidth does not yield a corresponding increase in information bandwidth.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices. Increasing the memory data bus speed can be used to help alleviate the latency issue. However, as with bandwidth, the increase in memory data bus speeds do not yield a linear reduction of latency, for essentially the same reasons previously discussed.

Although increasing memory data bus speed has, to some degree, been successful in increasing bandwidth and reducing latency, other issues are raised by this approach. For example, as the speed of the memory data bus increases, loading on the memory bus needs to be decreased in order to maintain signal integrity since traditionally, there has only been wire between the memory controller and the memory slots into which the memory modules are plugged. Several approaches have been taken to accommodate the increase in memory data bus speed. For example, reducing the number of memory slots, adding buffer circuits on a memory module in order to provide sufficient fanout of control signals to the memory devices on the memory module, and providing multiple memory device interfaces on the memory module since there are too few memory module connectors on a single memory device interface. The effectiveness of these conventional approaches are, however, limited. A reason why these techniques were used in the past is that it was cost-effective to do so. However, when only one memory module can be plugged in per interface, it becomes too costly to add a separate memory interface for each required memory slot. In other words, it pushes the system controllers package out of the commodity range and into the boutique range, thereby, greatly adding cost.

One recent approach that allows for increased memory data bus speed in a cost effective manner is the use of multiple memory devices coupled to the processor through a memory hub. In a memory hub architecture, or a hub-based memory sub-system, a system controller or memory controller is coupled over a high speed bi-directional or unidirectional memory controller/hub interface to several memory modules. Typically, the memory modules are coupled in a point-to-point or daisy chain architecture such that the memory modules are connected one to another in series. Thus, the memory controller is coupled to a first memory module, with the first memory module connected to a second memory module, and the second memory module coupled to a third memory module, and so on in a daisy chain fashion.

Each memory module includes a memory hub that is coupled to the memory controller/hub interface and a number of memory devices on the module, with the memory hubs efficiently routing memory requests and responses between the controller and the memory devices over the memory controller/hub interface. Computer systems employing this architecture can use a high-speed memory data bus since signal integrity can be maintained on the memory data bus. Moreover, this architecture also provides for easy expansion of the system memory without concern for degradation in signal quality as more memory modules are added, such as occurs in conventional memory bus architectures.

Although computer systems using memory hubs can provide superior performance, various factors may affect the performance of the memory system. For example, the manner in which the flow of read data upstream (i.e., back to the memory hub controller in the computer system) from one memory hub to another is managed will affect read latency. The management of the flow of read data by a memory hub may be generally referred to as arbitration, with each memory hub arbitrating between local memory read responses and upstream memory read responses. That is, each memory hub determines whether to send local memory read responses first or to forward memory read responses from downstream (i.e., further away from the memory hub controller) memory hubs first. Although the determination of which memory read response has lower priority will only affect the latency of that specific memory read response, the additive effect of the memory read responses having increased latency will affect the overall latency of the memory system. Consequently, the arbitration technique employed by a memory hub directly affects the performance of the overall memory system. Additionally, the implementation of the arbitration scheme will affect the overall read latency as well, since inefficient implementation will negatively impact system memory performance despite utilizing a desirable arbitration scheme. Therefore, there is a need for a system and method for implementing an arbitration scheme for managing memory responses in a system memory having a memory hub architecture.

SUMMARY OF THE INVENTION

A method according to one aspect of the invention includes transmitting a read response on a data path of a memory hub interposed between a transmitting memory hub and a receiving memory hub. The method includes receiving at the memory hub an arbitration packet including data indicative of a data path configuration for an associated read response. The arbitration packet is decoded, and the data path is configured in accordance with the data of the arbitration packet. The associated read response is received at the memory hub and the associated read response is coupled to the configured data path for transmitting the same to the receiving memory hub.

In another aspect of the invention, a memory hub coupled to at least one memory device is provided. The memory hub includes remote and local input nodes, an output node, and a configurable data path coupled to the remote and local input nodes and further coupled to the output node. The memory hub further includes an arbitration control circuit coupled to the configurable data path, the output node, and the remote input node. The arbitration control circuit generates an arbitration packet for an associated read response coupled through the local input node that includes data indicative of a data path configuration for the associated read response. The arbitration control circuit can further configure the configurable data path in accordance with the data included with an arbitration packet coupled thorough the remote input node in preparation of coupling an associated read response coupled through the remote input node to the output node.

In another aspect of the invention, a memory hub is provided having a bypass data path coupled between an input node and an output node on which read responses are coupled in response to being enabled, and further includes an arbitration control circuit. The arbitration control circuit is coupled to the bypass data path and generates an arbitration packet in response to retrieving read data from a memory device coupled to the memory hub. The arbitration packet has a data path field including activation data to enable a bypass data path of an upstream memory hub. The arbitration control circuit also receives an arbitration packet from a downstream memory hub and enables the bypass data path to couple a read response also received from the downstream memory hub from the input node to the output node.

DETAILED DESCRIPTION OF PREFERRED EMBODIMENTS

Figure 1:
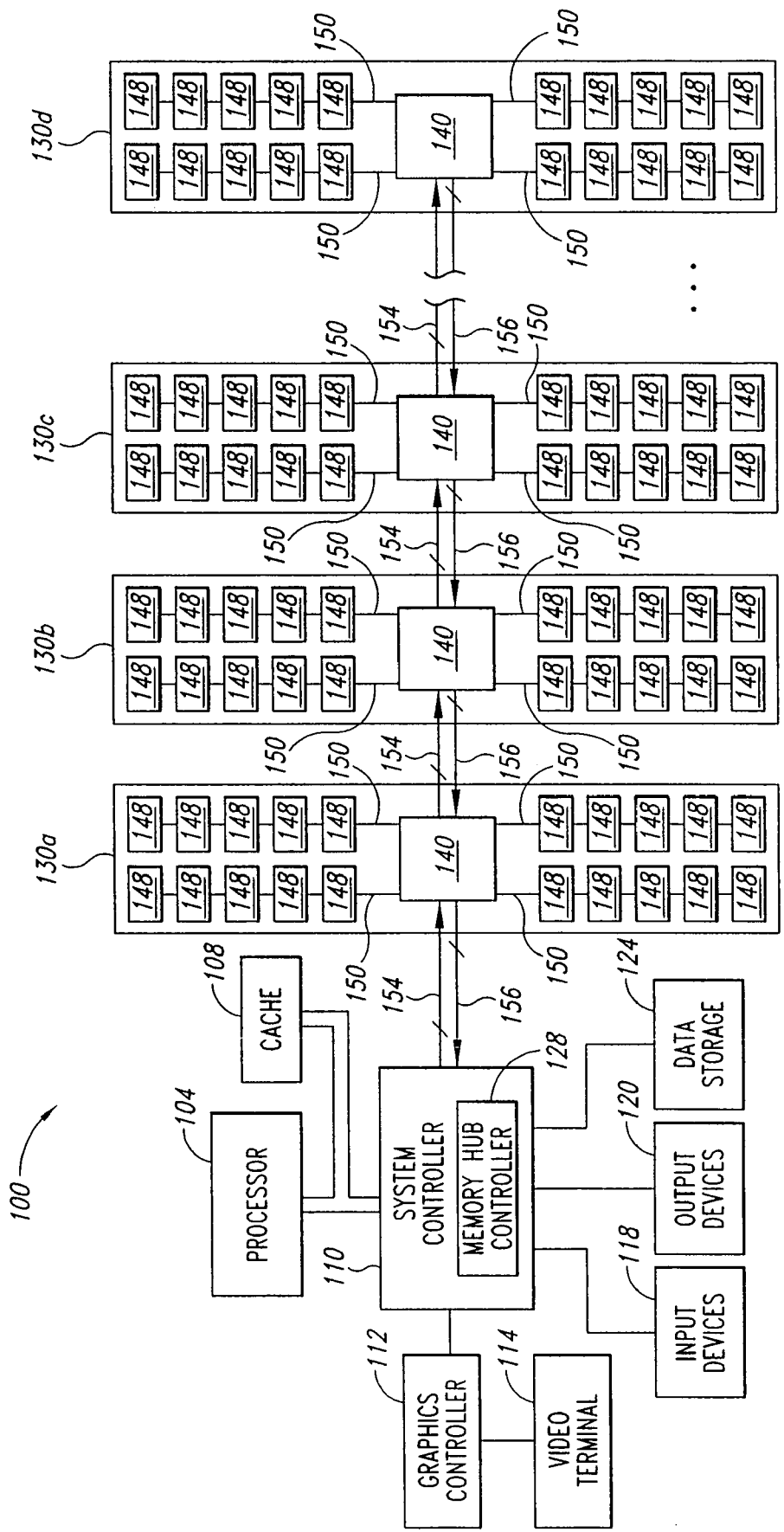
FIG. 1 is a partial block diagram of a computer system having a memory hub based system memory in which embodiments of the present invention can be implemented.

FIG. 1 illustrates a computer system 100 having a memory hub architecture in which embodiments of the present invention can be utilized. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). The processor bus 106 is further coupled to a system controller 110, which is also referred to as a bus bridge.

The system controller 110 also serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 contains a memory hub controller 128 coupled to several memory modules 130a-n through a bus system 154, 156. Each of the memory modules 130a-n includes a memory hub 140 coupled to several memory devices 148 through command, address and data buses, collectively shown as bus 150. The memory hub 140 efficiently routes memory requests and responses between the controller 128 and the memory devices 148. Each of the memory hubs 140 includes write buffers and read data buffers. Computer systems employing this architecture allow for the processor 104 to access one memory module 130a-n while another memory module 130a-n is responding to a prior memory request. For example, the processor 104 can output write data to one of the memory modules 130a-n in the system while another memory module 130a-n in the system is preparing to provide read data to the processor 104. Additionally, a memory hub architecture can also provide greatly increased memory capacity in computer systems.

Figure 2:
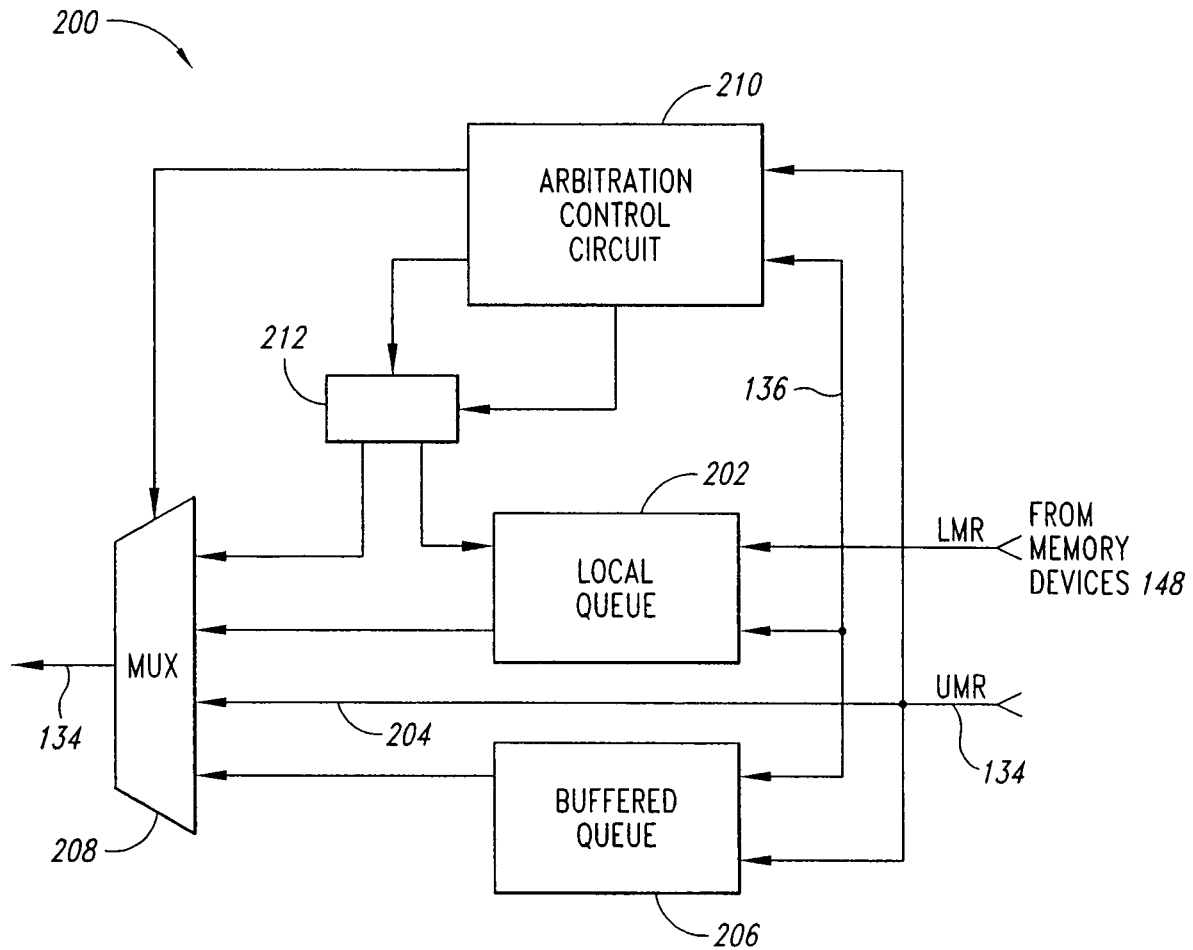
FIG. 2 is a functional block diagram of a arbitration control component according to an embodiment of the present invention that can be utilized in the memory hubs of FIG. 1.

FIG. 2 is a functional block diagram illustrating an arbitration control component 200 according to one embodiment of the present invention. The arbitration control component 200 can be included in the memory hubs 140 of FIG. 1. As shown in FIG. 2, the arbitration control component 200 includes two queues for storing associated memory responses. A local response queue 202 receives and stores local memory responses LMR from the memory devices 148 on the associated memory module 130. A remote response queue 206 receives and stores downstream memory responses which cannot be immediately forwarded upstream through a bypass path 204. An arbitration control circuit 210 is coupled to the queues 202, 206 through a control/status bus 136, which allows the arbitration control circuit 210 to monitor the contents of each of the queues 202, 206, and utilizes this information in controlling a multiplexer 208 to thereby control the overall arbitration process executed by the memory hub 140. The control/status bus 136 also allows "handshaking" signals to be coupled from the queues 202, 206 to the arbitration control circuit 210 to coordinate the transfer of control signals from the arbitration control circuit 210 to the queues 202, 206.

The arbitration control circuit 210 is further coupled to the high-speed link 134 to receive arbitration packets from downstream memory hubs. As will be explained in more detail below, arbitration packets are provided in advance of an associated memory response, and provide the arbitration control circuit 210 of an upstream memory hub with information to enable the appropriate path through the receiving memory hub in anticipation of receiving the associated memory response. Additionally, the arbitration control circuit 210 generates an arbitration packet to be provided prior to an associated LMR to serve as an early indication of the associated memory response when data is read from the memory devices 148 (FIG. 1) in response to a read request. As previously discussed, the arbitration packet will provide upstream memory hubs with appropriate information and give the respective arbitration control circuits 210 time to make decisions regarding enablement of the appropriate data paths before the memory response arrives. The arbitration control circuit 210 prepares the arbitration packet while read data for the memory response is being retrieved from memory devices 148. The arbitration packet is provided through a switch 212 to either the multiplexer 208 or the local response queue 202, depending on whether if the upstream memory hub is idle or busy. The multiplexer 208, under the control of the arbitration control circuit, couples the high-speed link 134 to receive memory responses from the remote response queue 206 or the bypass path 204, arbitration packets from the arbitration control circuit 210, or arbitration packets and memory responses from the local response queue 202. In an alternative embodiment of the present invention, the arbitration packets are generated in an arbitration packet circuit, rather than in the arbitration control circuit 210, as shown in FIG. 2. Additionally, although shown in FIG. 2 as providing the arbitration packet to the multiplexer 208 to be injected into the stream of data, the arbitration packet can alternatively be provided to the local response queue 202 and placed before the associated read response packet to be injected into the data stream. It will be appreciated by those ordinarily skilled in the art that modifications to the embodiments of the present invention, such as the location at which the arbitration packet is generated or the manner in which the arbitration packet is placed into the data stream prior to the associated read packet, can be made without departing from the scope of the present invention.

Figure 3:
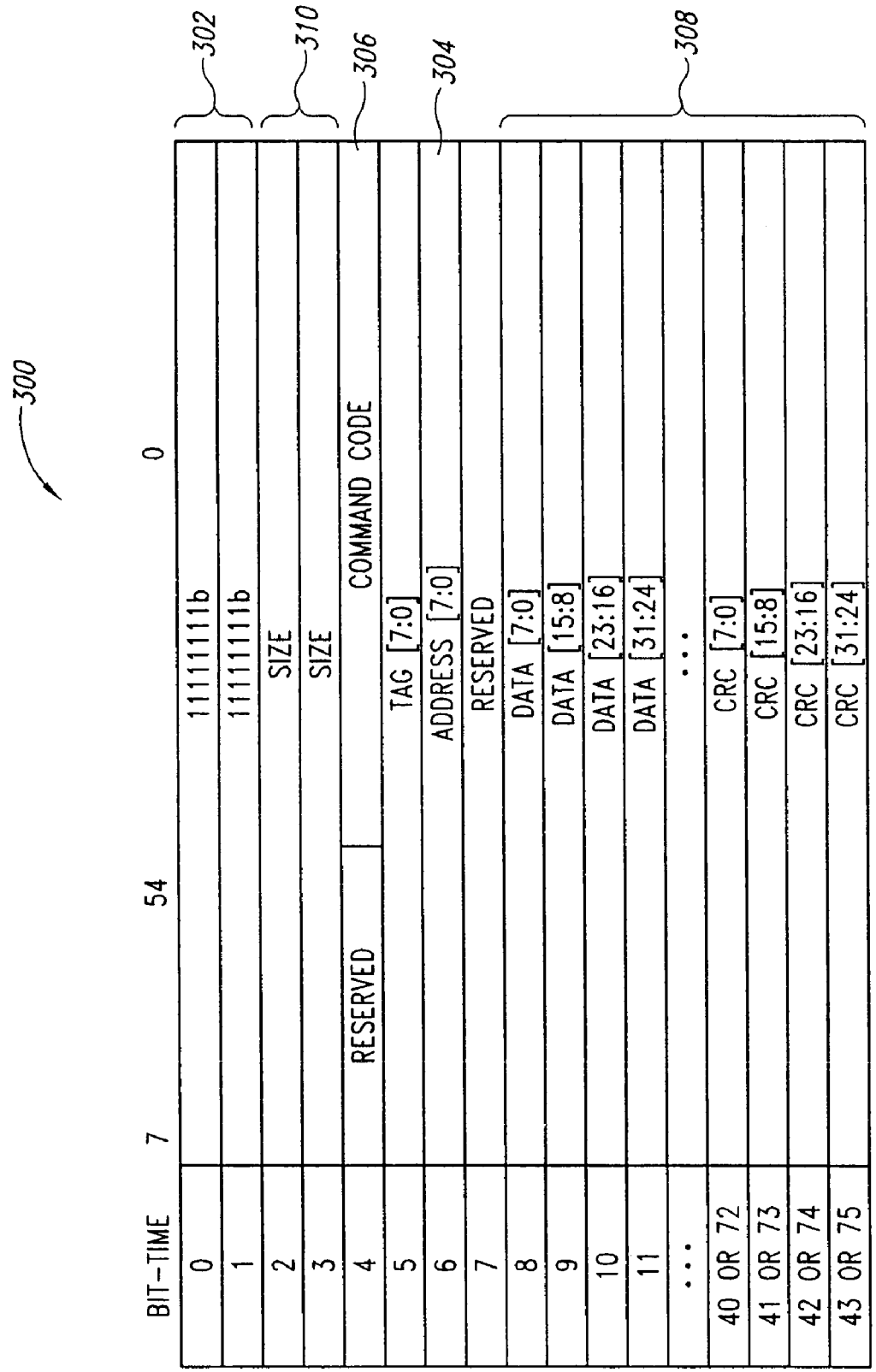
FIG. 3 is a data structure diagram of a arbitration packet and memory response according to an embodiment of the present invention.

FIG. 3 illustrates a data structure 300 for arbitration packets and memory responses according to an embodiment of the present invention. The data structure 300 is divided into 8-bit bytes of information, with each byte of information corresponding to a sequential bit-time. Each bit-time represents an increment of time in which new data can be provided. A response header field 302 includes two bytes of data that indicate the response is either an arbitration packet or a memory response. An address field 304 includes data that is used to identify the particular hub to which the arbitration packet or memory response is directed. A command code field 306 will have a value to identify the data structure 300 as an arbitration packet, and not as a memory response. Arbitration packets and memory responses are similar, except that the data payload of data fields 308 are "don't cares" for arbitration packets. In the data structure 300, all 16 bits of size fields 310 carry the same value to indicate the size of the data payload carried by the memory response. For example, a "0" indicates that 32 bytes of data are included, and a "1" indicates that 64 bytes of data are included. It will be appreciated by one ordinarily skilled in the art that the embodiment of the data structure 300 shown in FIG. 3 has been provided by way of example, and that modifications to the data structure 300 can be made without deviating from the scope of the present invention. For example, the number and type of data fields of the data structure 300 can be changed or the number of bits for each bit time can be changed and still remain within the scope of the present invention.

Figure 4A:
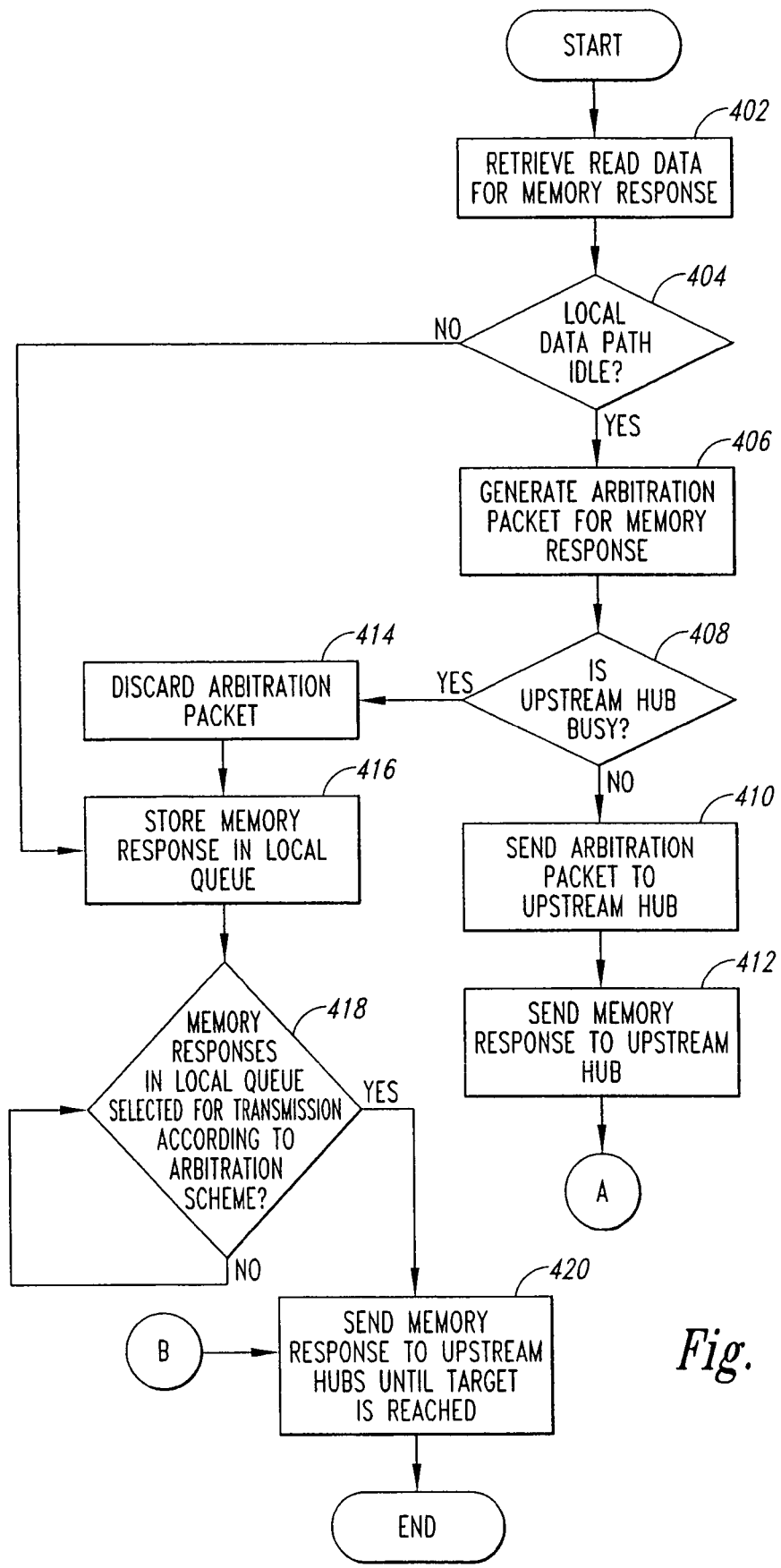
FIG. 4 is a flow diagram of the operation of the arbitration control component of FIG. 3 according to an embodiment of the present invention
Figure 4B:
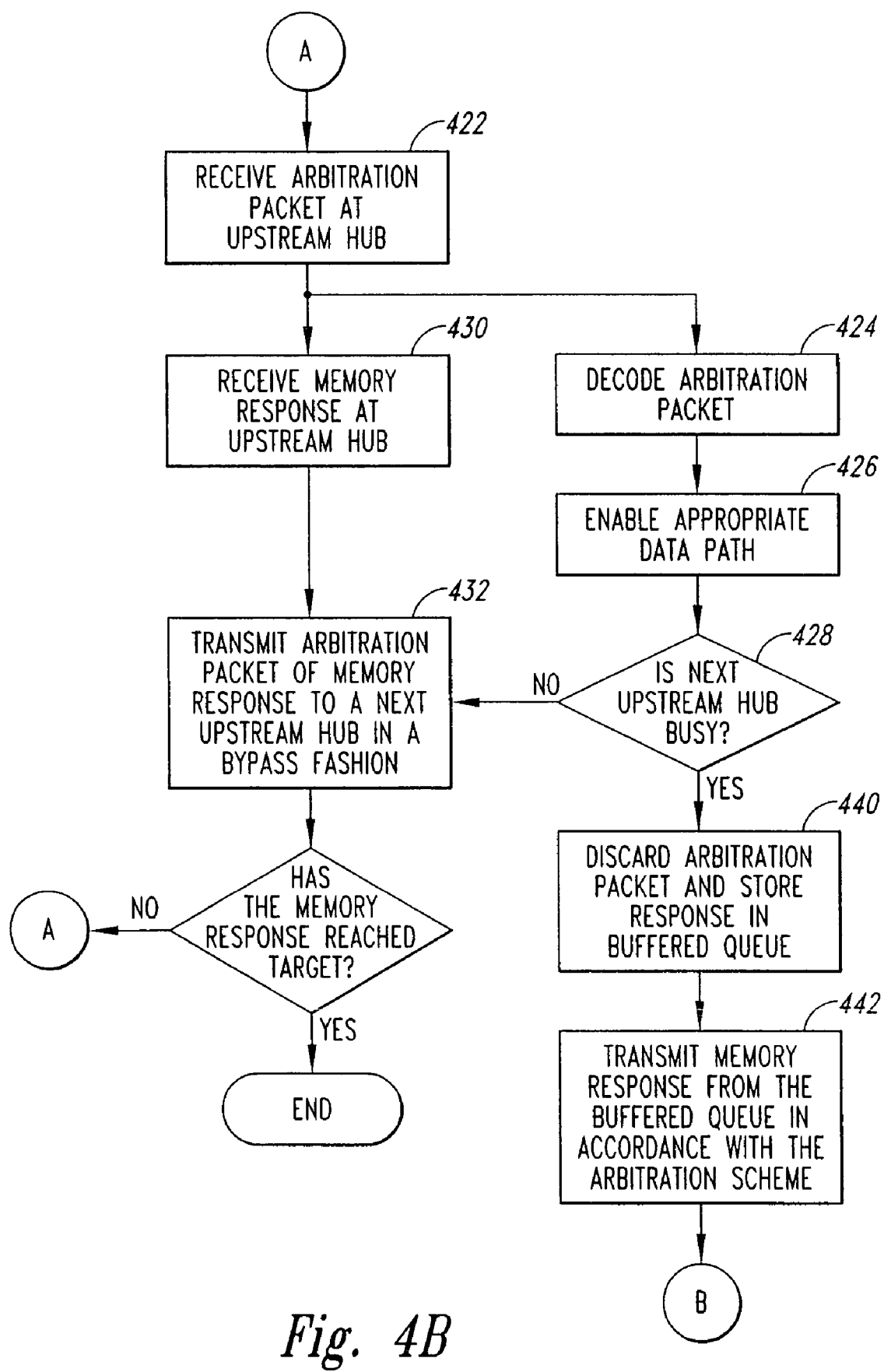

Operation of the arbitration control component 200 (FIG. 2) will be described with reference to the flow diagram of FIG. 4. Following the receipt of a read data command, at a step 402 the memory hub initiates a read operation to retrieve the requested read data from the memory devices 148 (FIG. 1) for the memory response that will be provided to the requesting target. At a step 404, the arbitration control circuit 210 of the memory hub determines whether the local data path is idle by checking the status of the local response queue 202. If the local data path is idle, an arbitration packet is generated by the arbitrations control circuit 210 during the retrieval of the read data from the memory devices 148 at a step 406. When the arbitration packet and the memory response have been prepared, and are ready for transmission, at a step 408 an upstream memory hub is queried to determine if it is busy. Where the upstream memory hub is idle, the arbitration packet is sent to the upstream memory hub, followed by the memory response at steps 410, 412. However, if the upstream memory hub is busy, the arbitration packet is discarded at a step 414 and the memory response is stored in a local response queue 202 at a step 416. Similarly, in the event that at the step 404 it was determined that the local data path is busy, the memory response is also stored in the local response queue at the step 416. At a step 418 the memory response is stored in the local response queue 202 until it is selected for transmission to the upstream memory hub in accordance with an arbitration scheme implemented by the memory hub. At a step 420, the memory response is transmitted through each upstream memory hub in accordance with the arbitration scheme until the memory response reaches the target destination. Suitable arbitration schemes are well known in the art, and will not be described in detail herein. An example of an arbitration scheme that is also suitable for use is described in more detail in commonly assigned, co-pending U.S. patent application Ser. No. 10/690,810, entitled ARBITRATION SYSTEM AND METHOD FOR MEMORY RESPONSES IN A HUB-BASED MEMORY SYSTEM to James W. Meyer and Cory Kanski, filed on Oct. 20, 2003, which is incorporated herein by reference.

As described therein, the local and remote response queues 202, 206 and the bypass path 204 are utilized to implement various response arbitration schemes. For example, in one embodiment, the arbitration control circuit executes an arbitration scheme that gives downstream responses, or remote responses, priority over local responses. Alternatively, in another embodiment described, the arbitration control circuit executes an arbitration scheme that gives priority to local responses over downstream responses. In another embodiment, the arbitration control circuit alternates between a predetermined number of responses from local and downstream memory, for example, local and remote responses can be alternately forwarded, or two local responses are forwarded followed by two remote responses, and so on. Another embodiment described therein utilizes an oldest first algorithm in arbitrating between local and downstream memory responses. That is, in operation, the arbitration control circuit 210 monitors response identifier portions of the memory responses stored in the local response queue and the remote response queue and selects the oldest response contained in either of these queues as the next response to be forwarded upstream. Thus, independent of the response queue in which a memory response is stored, the arbitration control circuit forwards the oldest responses first.

It will be appreciated by those ordinarily skilled in the art that other arbitration methods and schemes can be utilized without departing from the scope of the present invention.

Returning to the steps 410, 412 where the arbitration packet is first transmitted to an upstream memory hub and then followed by the memory response, the arbitration control circuit 210 of the upstream memory hub receives the arbitration packet at a step 422. The arbitration packet is decoded, and the appropriate data path is enabled by the arbitration control circuit 210 based on the information decoded at steps 424, 426. By the time the memory response is received at a step 430, the appropriate data path is enabled by the arbitration control circuit 210. At a step 428, the next upstream memory hub is queried to determine if it is busy. If not, the arbitration packet and then the memory response are transmitted to the next upstream memory hub in a bypass fashion at a step 432. The transmission of the arbitration packet and the memory response in the bypass fashion is facilitated by enabling the appropriate data path through the memory hub based on the decoded information of the arbitration packet that is sent at the step 410 before the associated memory response is sent at the step 412.

Returning to the step 428, if it is determined that the next upstream memory hub is busy, the arbitration packet is discarded at the step 440, and the memory response is stored in the remote response queue 206 until the memory response is selected for transmission to the next upstream memory hub according to the arbitration scheme employed at a step 442. At the step 420, the memory response will make its way upstream through the memory hubs in accordance with the arbitration scheme until reaching its target destination.

From the foregoing it will be appreciated that, although specific embodiments of the invention have been described herein for purposes of illustration, various modifications may be made without deviating from the spirit and scope of the invention. For example, embodiments of the present invention have been described herein with respect to a memory hub-based system memory used in a computer system. However, it will be appreciated that embodiments of the present invention can be used in memory systems other than hub-based memory systems, where appropriate. Moreover, embodiments of the present invention can also be used in memory hub-based systems that are utilized in processor based systems, as known in the art, other than computer systems. Accordingly, the invention is not limited except as by the appended claims.

What is claimed is:

1. A memory hub coupled to at least one memory device, the memory hub comprising:
   remote and local input nodes;
   an output node;
   a configurable data path coupled to the remote and local input nodes and further coupled to the output node, the configurable data path operable to couple at least one read response received by the remote and local input nodes to the output node; and
   an arbitration control circuit coupled to the configurable data path, the output node, and the remote and local input nodes, the arbitration control circuit operable to generate an arbitration packet that includes data indicative of a data path configuration for a local read response received by the local input node and operable to provide the arbitration packet to the output node prior to providing the associated read response to the output node, the arbitration control circuit further operable to configure the configurable data path in accordance with data included in a downstream arbitration packet received by the remote input node in preparation of coupling an associated downstream read response to the output node.

2. The memory hub of claim 1 wherein the configurable data path comprises:
   a multiplexer having an output coupled to the output node and a control node coupled to the arbitration control circuit;
   a bypass data path coupled to the remote input node and a first input of the multiplexer;
   a local queue having an input coupled to the local input node and further having an output coupled to a second input of the multiplexer; and
   a remote queue having an input coupled to the remote input node and further having an output coupled to a third input of the multiplexer, the arbitration control circuit operable to generate a control signal for the multiplexer to selectively couple the bypass data path, local queue, or remote queue to the output node.

3. The memory hub of claim 2 wherein the arbitration control circuit is operable to store the local read response received by the local input node in the local queue and the downstream read response in the remote queue until the output node is ready to receive the respective read response.

4. The memory hub of claim 1 wherein the arbitration control circuit is operable to determine whether a local data path of the memory hub coupled to the local input node is idle, and in the event that the local data path is idle, operable to generate the arbitration packet for the local read response received by the local input node.

5. The memory hub of claim 4 wherein the arbitration packet and the local read response of the local data path is selected for transmission to the output node responsive to a predetermined arbitration scheme.

6. The memory hub of claim 1 wherein the arbitration control circuit is further operable to generate data for the arbitration packet that is used to distinguish the arbitration packet from a read response.

7. The memory hub of claim 6 wherein the arbitration packet includes a plurality of 8-bit bytes of information, wherein the plurality of 8-bit bytes of information includes one byte of data used to distinguish the arbitration packet from the read response.

8. A memory hub, comprising:
a bypass data path coupled between an input node and an output node on which read responses are applied in response to being enabled; and
an arbitration control circuit coupled to the bypass data path operable to receive an arbitration packet from a downstream memory hub and enable the bypass data path to receive a read response from the downstream memory hub responsive to the received arbitration packet, the arbitration packet including a data path field having activation data to enable the bypass data path of an upstream memory hub, the arbitration control circuit further operable to query an upstream memory hub to enable a bypass data path of the upstream memory hub to receive the read response from the downstream memory hub when the upstream memory hub is not busy.

9. The memory hub of claim 8, further comprising:
a multiplexer having an output coupled to the output node and a control node coupled to the arbitration control circuit, the multiplexer further having a first input coupled to the bypass data path;
a local queue having an input coupled to a local input node and further having an output coupled to a second input of the multiplexer; and
a remote queue having an input coupled to the input node and further having an output coupled to a third input of the multiplexer, the arbitration control circuit operable to generate a control signal for the multiplexer to selectively couple the bypass data path, local queue, or remote queue to the output node.

10. The memory hub of claim 9 wherein the arbitration control circuit is operable to store the read response received from the downstream memory hub in the remote queue when the upstream memory hub is busy.

11. The memory hub of claim 10 wherein the arbitration control circuit is operable to store read data from a memory device coupled to the memory hub in the local queue, and generate an arbitration packet in response to the received read data when the upstream memory hub is not busy.

12. The memory hub of claim 8, wherein the arbitration packet includes a plurality of 8-bit bytes of data, wherein the plurality of 8-bit bytes includes one byte of data used to distinguish the arbitration packet from the read response.

13. A memory module, comprising:
a plurality of memory devices; and
a memory hub coupled to the memory devices through a memory device bus to access the memory devices, the memory hub comprising:
remote and local input nodes, the local input node coupled to the memory device bus;
an output node;
a configurable data path coupled to the remote and local input nodes and further coupled to the output node, the configurable data path operable to couple at least one read response received by the remote and local input nodes to the output node; and
an arbitration control circuit coupled to the configurable data path, the output node, and the remote and local input nodes, the arbitration control circuit operable to generate an arbitration packet that includes data indicative of a data path configuration for a local read response received by the local input node and operable to provide the arbitration packet to the output node prior to providing the read response to the output node, the arbitration control circuit further operable to configure the configurable data path in accordance with data included in a downstream arbitration packet received by the remote input node in preparation of coupling an associated downstream read response to the output node.

14. The memory module of claim 13 wherein the configurable data path of the memory hub comprises:
a multiplexer having an output coupled to the output node and a control node coupled to the arbitration control circuit;
a bypass data path coupled to the remote input node and a first input of the multiplexer;
a local queue having an input coupled to the local input node and further having an output coupled to a second input of the multiplexer; and
a remote queue having an input coupled to the remote input node and further having an output coupled to a third input of the multiplexer, the arbitration control circuit operable to generate a control signal for the multiplexer to selectively couple the bypass data path, local queue, or remote queue to the output node.

15. The memory module of claim 14 wherein the arbitration control circuit is operable to store the local read response received by the local input node in the local queue and the downstream read response in the remote queue until the output node is ready to receive the respective read response.

16. The memory module of claim 13 wherein the arbitration control circuit is operable to determine whether a local data path of the memory hub coupled to the local input node is idle, and in the event that the local data path is idle, operable to generate the arbitration packet for the local read response received by the local input node.

17. The memory module of claim 13 wherein the arbitration packet includes a plurality of 8-bit bytes of information, wherein the plurality of 8-bit bytes of information includes one byte of data used to distinguish the arbitration packet from the read response.

18. A memory module, comprising:
a plurality of memory devices; and
a memory hub coupled to the memory devices through a memory device bus to access the memory devices, the memory hub comprising:
a bypass data path coupled between an input node and an output node on which read responses are applied in response to being enabled; and
an arbitration control circuit coupled to the bypass data path operable to receive an arbitration packet from a downstream memory hub and enable the bypass data path to receive a read response from the downstream memory hub responsive to the received arbitration packet, the arbitration packet including a data path field having activation data to enable the bypass data path of an upstream memory hub, the arbitration control circuit further operable to query an upstream memory hub to enable a bypass data path of the upstream memory hub to receive the read response from the downstream memory hub when the upstream memory hub is not busy.

19. The memory module of claim 18 wherein the memory hub further comprises:
a multiplexer having an output coupled to the output node and a control node coupled to the arbitration control circuit, the multiplexer further having a first input coupled to the bypass data path;
a local queue having an input coupled to a local input node and further having an output coupled to a second input of the multiplexer; and a remote queue having an input coupled to the input node and further having an output coupled to a third input of the multiplexer, the arbitration control circuit operable to generate a control signal for the multiplexer to selectively couple the bypass data path, local queue, or remote queue to the output node.

20. The memory module of claim 19 wherein the arbitration control circuit is operable to store the memory response received from the downstream memory hub in the remote queue when the upstream memory hub is busy.

21. The memory module of claim 20 wherein the arbitration control circuit is operable to store read data from a memory device coupled to the memory hub in the local queue, and generate an arbitration packet in response to the received read data when the upstream memory hub is not busy.

22. The memory module of claim 18, wherein the arbitration packet includes a plurality of 8-bit bytes of data, wherein the plurality of 8-bit bytes includes one byte of data used to distinguish the arbitration packet from the read response.

23. A memory system having a plurality of memory modules, each memory module including a memory hub, the memory system comprising:

a memory bus;
a first memory hub having a first input terminal and a first output terminal coupled to the memory bus, the first memory hub including a first arbitration control circuit operable to generate a first arbitration packet including information to configure a data path responsive to retrieving read data from a memory device coupled to the first memory hub and provide the first arbitration packet to the memory bus through the first output terminal prior to providing the read data; and
a second memory hub having a second input terminal and a second output terminal coupled to the memory bus, the second memory hub including a second arbitration control circuit configured to receive the first arbitration packet, the second arbitration control circuit operable to configure the data path in accordance with the information in the first arbitration packet, the second arbitration control circuit further operable to generate a second arbitration packet indicative of either the information of the first arbitration packet or read data retrieved from a memory device coupled to the second memory hub, and provide the second arbitration packet to the output terminal prior to providing the corresponding read data, each of the arbitration control circuits of the first and second memory hubs operable to store the read data and the read response when the first and second output terminals are busy.

24. The memory system of claim 23 wherein each of the arbitration packets comprises a data structure having a command code field that identifies the data structure as an arbitration packet that is distinguishable from a read response, and an address field that includes data to identify the particular hub to which the arbitration packet or the read response is directed.

25. The memory system of claim 23 wherein each of the arbitration packets includes a plurality of 8-bit bytes of information, wherein the plurality of 8-bit bytes of information includes one byte of data used to distinguish the arbitration packet from the read response.

26. A memory system, comprising:

a plurality of memory modules, each having a memory hub configured to be in communication with each other, each of the memory hubs operable to propagate memory requests downstream and read responses upstream from one memory hub to another memory hub towards a memory controller;
a responding memory module having a responding memory hub, the responding memory hub comprising:
a local input node configured to receive read data from a memory device coupled to the responding memory hub by a local data path to generate a read response that includes the read data;
a remote input node configured to receive a downstream arbitration packet and associated read response from a downstream memory hub on a memory bus; and
an arbitration control circuit coupled to the local input node and the remote input node, the arbitration control circuit operable to determine whether the local data path of the responding memory hub is idle, and in the event that the local data path is idle, operable to encode a data path configuration in an arbitration packet to transmit the read response received by the local input node to transmit towards the memory controller, the arbitration control circuit further operable to decode the downstream arbitration packet received by the remote input node to generate an upstream arbitration packet encoding a data path to transmit the downstream read response to the memory controller.

27. The memory system of claim 26 wherein each of the arbitration packets comprises a command code field that identifies its data structure as an arbitration packet that is distinguishable from the read response, and an address field that includes data to identify the particular hub to which the arbitration packet or the read response is directed.

28. The memory system of claim 26 wherein each of the arbitration packets is transmitted prior to transmitting the associated read response.

29. A memory hub coupled to at least one memory device, the memory hub comprising:

remote and local input nodes;
an output node;
a configurable data path coupled to the remote and local input nodes and further coupled to the output node, the configurable data path operable to couple at least one of a read response coupled through the remote and local input nodes to the output node; and
an arbitration control circuit coupled to the configurable data path, the output node, and the remote input node, the arbitration control circuit operable to generate an arbitration packet for an associated read response coupled through the local input node and further operable to generate data for the arbitration packet that is used to distinguish the arbitration packet from the associated read response, the arbitration packet including data indicative of a data path configuration for the associated read response, the arbitration control circuit further operable to configure the configurable data path in accordance with the data included with an arbitration packet coupled thorough the remote input node in preparation of coupling an associated read response coupled through the remote input node to the output node.

30. The memory hub of claim 29 wherein the configurable data path comprises:

a multiplexer having an output coupled to the output node and a control node coupled to the arbitration control circuit;
a bypass data path coupled to the remote input node and a first input of the multiplexer;

a local queue having an input coupled to the local input node and further having an output coupled to a second input of the multiplexer; and a remote queue having an input coupled to the remote input node and further having an output coupled to a third input of the multiplexer, the arbitration control circuit operable to generate a control signal for the multiplexer to selectively couple the bypass data path, local queue, or remote queue to the output node.

31. A memory hub, comprising:

a bypass data path coupled between an input node and an output node on which read responses are coupled therebetween in response to being enabled;

an arbitration control circuit coupled to the bypass data path operable to generate an arbitration packet in response to retrieving read data from a memory device coupled to the memory hub, the arbitration packet having a data path field including activation data to enable a bypass data path of an upstream memory hub, the arbitration control circuit further operable to receive an arbitration packet from a downstream memory hub and enable the bypass data path to couple a read response received therefrom from the input node to the output node;

a multiplexer having an output coupled to the output node and a control node coupled to the arbitration control circuit, the multiplexer further having a first input coupled to the bypass data path;

a local queue having an input coupled to a local input node and further having an output coupled to a second input of the multiplexer; and a remote queue having an input coupled to the input node and further having an output coupled to a third input of the multiplexer, the arbitration control circuit operable to generate a control signal for the multiplexer to selectively couple the bypass data path, local queue, or remote queue to the output node.

32. A memory hub coupled to at least one memory device, the memory hub comprising:

remote and local input nodes;

an output node;

a configurable data path coupled to the remote and local input nodes and further coupled to the output node, the configurable data path operable to couple at least one read response received by the remote and local input nodes to the output node; and an arbitration control circuit coupled to the configurable data path, the output node, and the remote and local input nodes, the arbitration control circuit operable to generate an arbitration packet that includes data indicative of a data path configuration for a local read response received by the local input node and operable to determine whether a local data path of the memory hub coupled to the local input node is idle, and in the event that the local data path is idle, operable to generate the arbitration packet for the local read response received by the local input node, the arbitration control circuit further operable to configure the configurable data path in accordance with data included in a downstream arbitration packet received by the remote input node in preparation of coupling an associated downstream read response to the output node.

* * * * *